US006278656B1

(12) United States Patent
Tyagi et al.

(10) Patent No.: US 6,278,656 B1
(45) Date of Patent: Aug. 21, 2001

(54) MANIPULATION OF ACOUSTIC WAVES USING A FUNCTIONALLY GRADED MATERIAL AND PROCESS FOR MAKING THE SAME

(75) Inventors: Vineet Tyagi; David A. Tinch, both of Albuquerque, NM (US)

(73) Assignee: LightPath Technologies, Inc., Albuquerque, NM (US)

( * ) Notice: Subject to any disclaimer, the term of this patent is extended or adjusted under 35 U.S.C. 154(b) by 0 days.

(21) Appl. No.: 09/389,690

(22) Filed: Sep. 2, 1999

(51) Int. Cl.[7] .......... H04B 1/02
(52) U.S. Cl. .......... 367/138
(58) Field of Search .......... 367/138, 152; 73/642; 333/145, 147

(56) References Cited

U.S. PATENT DOCUMENTS 5,241,287 * 8/1993 Jen .......... 333/145
5,481,918 1/1996 Hasegawa et al. .......... 73/642

OTHER PUBLICATIONS

A. Abramovich, "Acoustic Properties of Gradient Glasses", International Congress on Glass 18$^{th}$ proceedings, 1980.

* cited by examiner

*Primary Examiner*—Daniel T. Pihulic
(74) *Attorney, Agent, or Firm*—David W. Collins

(57) ABSTRACT

A device for manipulation of acoustic waves is provided, comprising a functionally-graded material for interposing between a source of the acoustic waves and a target, which may be a detector of manipulated acoustic waves. The functionally-graded material has a gradient in acoustic wave velocity which is obtained by the generation of a gradient in at least one of the following properties: elastic modulus, Poisson's ratio, and density, that is perpendicular to a direction of propagation of the acoustic waves. The gradient is axial. Biaxial acoustic velocity gradients may be used for focusing/waveguiding (high-low-high) or dispersing (low-high-low), while monoaxial acoustic velocity gradients may be used for wave steering. Also in accordance with the present invention, a method of making the device is provided, comprising: (a) providing the source of acoustic waves; (b) providing the target for acoustic waves, e.g., detector of manipulated acoustic waves; (c) providing the functionally-graded material having a gradient in at least one material property; and (d) interposing the functionally-graded material between the source of acoustic waves and the target for acoustic waves such that the gradient is perpendicular to a direction of propagation of the acoustic waves. The functionally-graded material so provided can be used to manipulate, i.e., focus, disperse, steer, waveguide acoustic waves for applications such as, acoustoelectronics, acoustooptics, SONAR, ultrasonic imaging, non-destructive testing (NDT), etc.

16 Claims, 4 Drawing Sheets

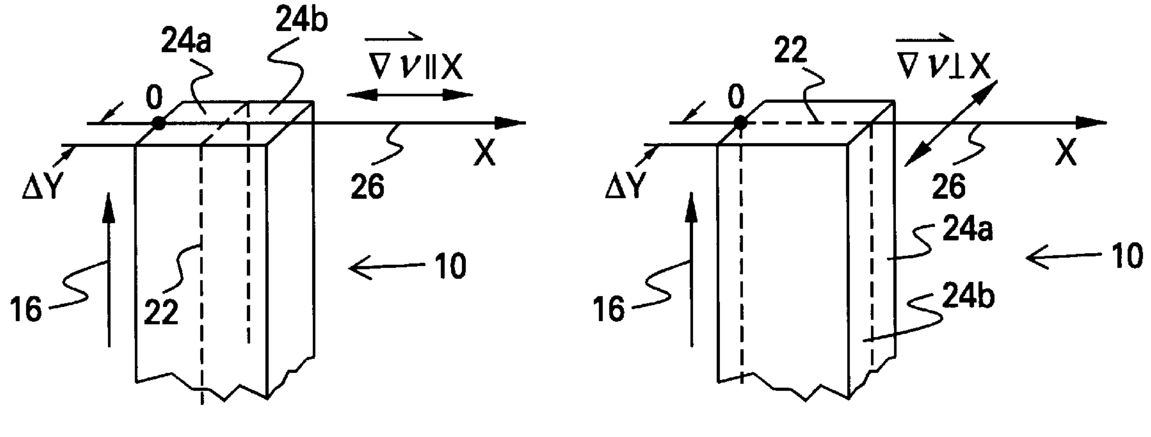
FIG. 3a
FIG. 3b
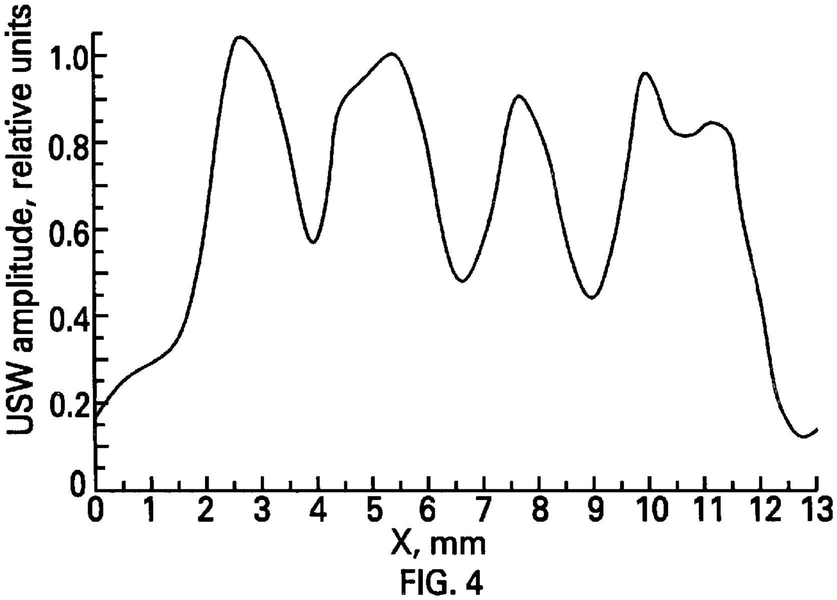
FIG. 4

MANIPULATION OF ACOUSTIC WAVES USING A FUNCTIONALLY GRADED MATERIAL AND PROCESS FOR MAKING THE SAME

TECHNICAL FIELD

The present invention is generally directed to the manipulation (e.g., focusing, dispersing, steering, waveguiding, etc.) of acoustic (sound) waves, and, more particularly to the use of materials having a gradient in acoustic velocities (transverse and longitudinal). These velocity gradients are obtained by generating a gradient in one or more of the following properties: elastic modulus, Poisson's ratio, and density.

BACKGROUND ART

Acoustic waves, e.g., ultrasonic waves, find use in a variety of applications. In many such applications, it is desired to manipulate the acoustic waves in order to focus, disperse, steer, waveguide, or otherwise alter them. There are several different techniques used to fabricate materials with gradients in material properties, such as ion exchange, chemical vapor deposition (CVD), sol-gel, etc.

Chemical vapor deposition techniques can be used to fabricate a gradient in material properties. CVD requires that the reactants be present in the gaseous phase and that the reactants are able to react with each other. This places a restriction on the choice of chemicals that can be used in the fabrication of the final gradient profile, thereby reducing the ability to generate specific property gradients as a function of thickness. Also, this technique is typically used when impurity levels in the material need to be restricted to part per billion (ppb) levels. Due to this fact, this technique is highly capital intensive and time-consuming. Although, the use of CVD can be extended to acoustoelectronics, acoustooptics, and other ultrasonic engineering applications, its use is primarily constrained to fiber optics, photonics, and the semiconductor industry.

Sol-gel processes can also be used to fabricate a gradient in material properties. Unlike CVD, this technique involves the reaction of constituents in the liquid phase. The formation of the gel is restricted by the kinetics of the chemical reaction, which limits the available reactants for production of the gradient profile. Furthermore, failure due to drying shrinkage places a limitation on the dimensions of the final product and is an inherent disadvantage to this technology.

Surface modification for the generation of property gradients in crystals and glasses can be achieved by diffusion of ionic species into or out of the substrate material. The case where the inward diffusing species (ions) replaces the outward moving species, is referred to as ion exchange. A recent publication by A. Abramovich entitled "Acoustic Properties of Gradient Glasses", published in the proceedings of the $18^{th}$ International Congress on Glass, discloses the use of optical glasses having a gradient in the optical index of refraction and formed by ion-exchange for acoustoelectronics, acoustooptics, and other ultrasonic applications. In glasses, the diffusion of ions occurs through the interstitial volume of the glass structure, whereas in crystals, the diffusion occurs through the interstitial lattice. The diffusion of ions into glass or crystalline materials usually follows Fick's laws of diffusion. According to Fick's laws, the rate of ion diffusion decreases with time and increases with temperature. In glasses, the maximum diffusion temperature is determined by the glass transformation temperature ($T_g$) of the substrate glass. Thus, obtaining large diffusion depths at a temperature below $T_g$ becomes difficult for reasonable amounts of time. In crystals, the diffusion mechanisms are more complex and their description is outside the scope of this invention. However, it will suffice to say that the time and temperature relationships in regard to the depth of ion penetration are similar to that of glasses.

Surface modification of the material substrates using ion exchange or solid state diffusion imposes several limitations with regards to obtaining a particular property gradient. Firstly, the maximum total change in a particular property is dependent upon the diffusing species and does not result in any major structural changes in the material. Therefore, the total change is typically very small. The propagating wave would not see a large difference in acoustic velocity (transverse or longitudinal); therefore, there exists only a limited ability to manipulate the acoustic waves. Secondly, this technique offers the ability to create a variety of functional distributions of a material property, but does not offer the flexibility to tailor a specific material property profile. Thirdly, the total distance across which the material property gradient exists is limited due to the nature of ion exchange phenomena and solid state diffusion. This does not allow for the fabrication of material property gradients across a large thickness.

Therefore, there is a need to provide a tailored element for manipulating acoustic waves, with a gradient throughout its thickness and the flexibility to obtain this gradient across a large thickness. By "large thickness" herein is meant a thickness on the order of about 6 to 30 mm, which is to be compared to the gradient thickness achieved by ion exchange, which is at most only a few mm.

DISCLOSURE OF INVENTION

In accordance with the present invention, a device for manipulation of acoustic waves is provided, comprising a functionally-graded material for interposing between a source of the acoustic waves and a target. The target may be an object upon which the acoustic waves are incident, such as a detector for measuring the intensity of the manipulated acoustic waves across the thickness, an imaging sensor, a specimen under non-destructive testing, or a recipient of focused acoustic energy, such as kidney or gall stones. The functionally-graded material has a gradient in one or both of the acoustic velocities (transverse or longitudinal) across the thickness. The gradient in acoustic velocities is achieved by creating a gradient in at least one of the following material properties: elastic modulus, Poisson's ratio, and density, that is perpendicular to a direction of propagation of the acoustic waves. The gradient is axial, as opposed to radial. Axial gradients having a parabolic or gaussian types of acoustic velocity gradients, such that the highest acoustic velocity is at the surfaces and the lowest acoustic velocity is in the center (positive), may be used for focusing. A negative axial gradient having a parabolic or guassian type acoustic velocity gradient, such that the lowest acoustic velocity is at the surfaces and the highest acoustic velocity is in the center, may be used for dispersing acoustic waves. These types of profiles can be fabricated by gluing or fusing two halves of a specific acoustic velocity profile at the high or low acoustic velocity faces, in subsequent text herein referred to as a biaxial. A continuously increasing, continuously decreasing, or any other special function of acoustic wave velocities may be used for wave steering.

Also in accordance with the present invention, a method of making the device is provided, comprising:

(a) providing the source of acoustic waves;

(b) providing the target for acoustic waves, such as the detector for measuring the acoustic wave intensity across the thickness;

(c) providing the functionally-graded material having a gradient in one or both of the acoustic properties (transverse or longitudinal) across the thickness, the gradient in acoustic properties being achieved by creating a gradient in at least one of elastic modulus, Poisson's ratio, and density; and (d) interposing the functionally-graded material between the source of acoustic waves and the target for acoustic waves such that the gradient is perpendicular to a direction of propagation of the acoustic waves.

The process of the present invention provides a functionally-graded material with a gradient in properties such as elastic modulus, Poisson's ratio, and density for the purpose of obtaining a gradient in acoustic velocity.

The functionally-graded material so provided can be used to manipulate, i.e., focus, disperse, steer, or waveguide acoustic waves for applications such as acoustoelectronics, acoustooptics, SONAR, ultrasonic imaging, non-destructive testing (NDT), etc.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

FIG. 3*a* is a schematic drawing showing the direction of the ultrasonic wave (USW) detector movement (X) being parallel to the direction of the acoustic velocity gradient ($\nabla_v^{\rightarrow}$), with ΔY in the drawing being the ultrasonic wave detector shift from the sample butt-end edge;

FIG. 3*b* is a schematic drawing similar to FIG. 3*a*, but the direction $\nabla_v^{\rightarrow}$ is perpendicular to the X-direction;

FIG. 4, on coordinates of amplitude (relative units) and distance X (in mm), is a plot of the ultrasonic wave amplitude as a function of distance along the X-direction for a homogeneous sample, where ΔY is 6 mm;

BEST MODES FOR CARRYING OUT THE INVENTION

Reference is now made in detail to a specific embodiment of the present invention, which illustrates the best mode presently contemplated by the inventors for practicing the invention. Alternative embodiments are also briefly described as applicable.

The purposes of the present invention is to provide a functionally-graded material that can be used for manipulation (focus, disperse, steer, waveguide, etc.) of ultrasonic waves and to provide a unique process to make the material that has been specifically designed to provide such manipulation.

Acoustic waves, as used herein, refer to sound waves, including infrasonic, audible, and ultrasonic waves. The operational velocity of the particular application governs the choice of base glasses for the fabrication of the acoustic velocity gradient.

For acoustic waves, there are two primary types of wave propagation mechanisms: longitudinal and transverse. The difference in the two mechanisms arises from the way in which the atoms of the propagating medium oscillate about their mean position for the wave to propagate. The velocity of propagation depends on the material properties such as elastic modulus, Poisson's ratio, density, etc. Manipulation of acoustic waves can be achieved if a material with functional grading in at least one of the above-mentioned material properties is designed. Equations (1) and (2) give the relationship between the material properties and the velocities.

$$V_L=\{(E/\rho)\times[1-\nu)/(1+\nu)\times(1-2\nu)]\}^{1/2} \quad (1)$$

$$V_T=\{E/[2\rho\times(1\times\nu)]\}^{1/2} \quad (2)$$

where, $V_T$=velocity of transverse wave in the medium $V_L$=velocity of longitudinal wave in the medium ρ=density of the medium E=elastic modulus of the medium ν=Poisson's ratio of the medium.

Figure 1:
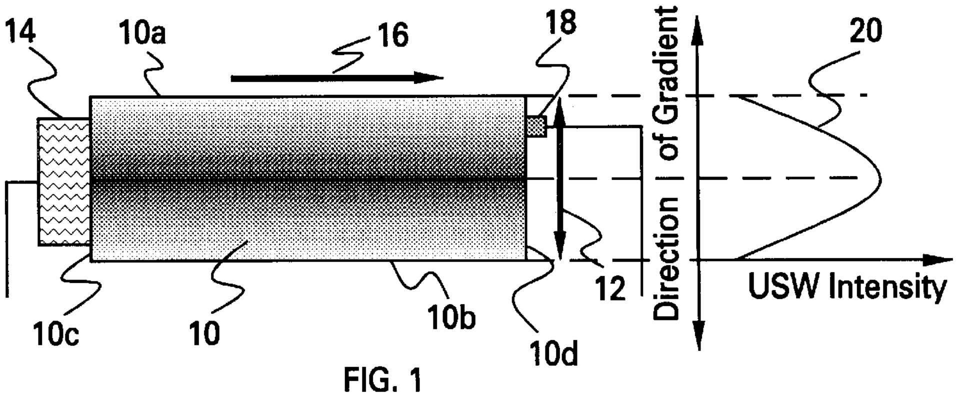
FIG. 1 is a schematic drawing, depicting ultrasonic wave focusing using a functionally-graded material.

If a gradient exists in the longitudinal/transverse velocities of the acoustic wave across the thickness of the material, then the waves can be focused, dispersed, steered, or waveguided. A specific gradient would have to be designed to obtain a particular performance. For example, to obtain focusing of acoustic waves, the gradient in the wave velocities would have to be parabolic in nature. FIG. 1 shows the gradient material and the direction of propagation of acoustic waves in it.

Figure 2:
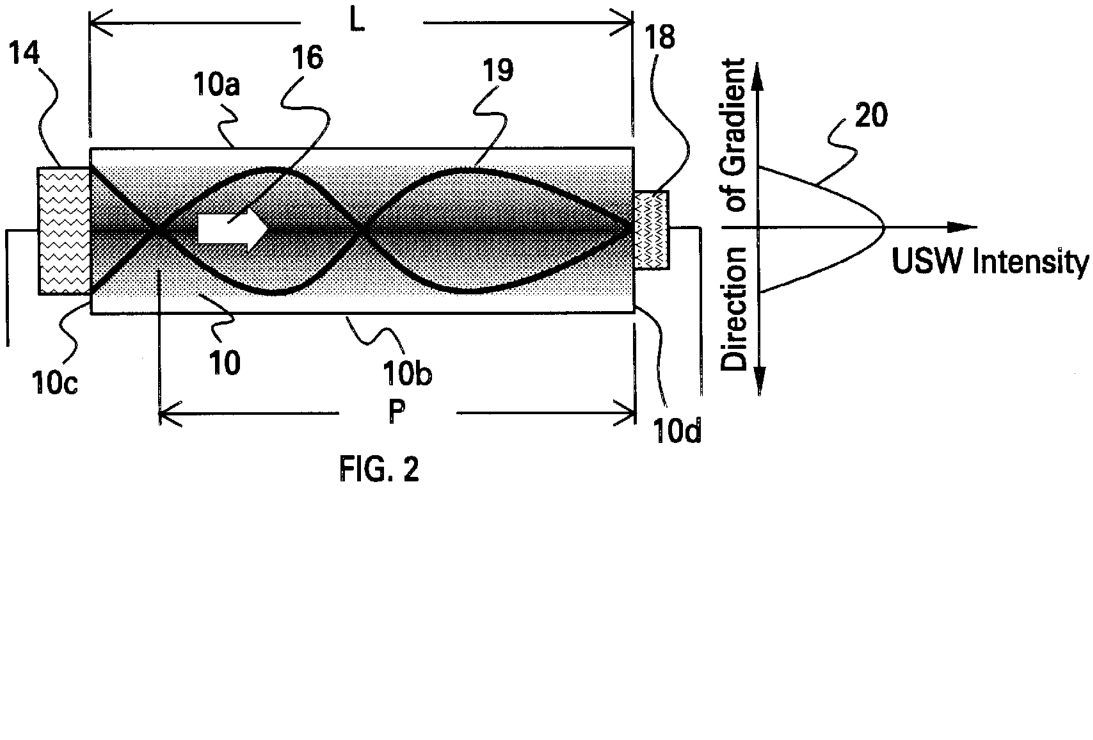
FIG. 2 is a schematic drawing illustrating the propagation of acoustic waves in a waveguide where the highest acoustic wave velocity is present at the outer surfaces and the lowest acoustic wave velocity is present in the center.

In particular, FIG. 1 shows a slab 10 of gradient material, here biaxial, so that the gradient direction 12 in acoustic velocity ranges from the center to the opposed surfaces 10*a*, 10*b* from low to high. That is to say, the gradient of the biaxial slab ranges from one surface 10*a* to the opposite surface 10*b* from a high acoustic velocity to a low acoustic velocity in the center to a high acoustic velocity at the opposite surface, or high-low-high. While biaxial gradient materials are well-known, and typically comprise two single gradient blocks joined along either the low gradient faces, producing a high-low-high gradient, or the high gradient faces, producing a low-high-low gradient, such biaxial gradient materials have not heretofore been used in the application of manipulating acoustic waves. Fabrication of biaxial gradient glasses having a gradient in index of refraction is shown, for example, in U.S. Pat. No. 5,689,374, issued to X. Xu et al on Nov. 18, 1997, and assigned to the same assignee as the present application. In the present invention, the two single gradient blocks are joined along either the low acoustic velocity faces, producing a high-low-high gradient, as shown in FIGS. 1 and 2, or the high acoustic velocity faces, producing a low-high-low gradient.

Optical elements containing a graded index of refraction are well-known; see, e.g., U.S. Pat. No. 4,907,864, issued to James J. Hagerty et al, U.S. Pat. No. 5,200,858, issued to James J. Hagerty et al, and U.S. Pat. No. 5,392,431, issued to Richard N. Pfisterer, all assigned to the same assignee as the present invention. Such optical elements are often referred to in the patent and technical literature as GRIN (graded refractive index) elements, and are available commercially from LightPath Technologies, Inc. (Albuquerque, N. Mex.) under the trademark GRADIUM® elements.

The fabrication of such graded index of refraction glass has been disclosed in a number of references, including starting from glass powders, each having a different composition (U.S. Pat. No. 4,883,522, issued to James J. Hagerty et al), starting from stacked glass plates, each having a different composition (U.S. Pat. No. 4,929,065, issued to James J. Hagerty et al), and starting from glass frits, each measured portion of frit having a different composition (U.S. Pat. No. 5,630,857, issued to Xiaojie Xu et al), all assigned to the same assignee as the present invention.

The fabrication process is often described as a fusion/diffusion process, in that various layers of different composition are first fused together, followed by diffusion of one or more species. For example, in lead-silicate-based glasses, lead is the chief diffusing species.

A functional gradient in material properties can be generated across the thickness in a glass using the fusion/diffusion process. Glasses are chosen based on the desired gradient in the material property. They are layered one on top of the other to obtain a step gradient in the properties. The layer stack is then subjected to higher temperatures for extended time periods to obtain a continuous gradient which develops due to the inter-diffusion of the mobile glass constituents at high temperatures. Change in process variables such as thickness of layer, composition of glass, temperature/time of diffusion etc., allows the generation of a specific functional gradient. It should be pointed out that the gradient that develops using this process is axial. Also, the layers of glasses could be plates of various thicknesses or frits of different mass fractions. Analogous to the process that is used for developing an axial gradient in refractive index (GRADIUM®—for use in optics), this process can be used for developing gradients in material properties such as, elastic modulus, Poisson's ratio, shear wave/transverse wave velocity, etc. The products made using this process may be for acoustic applications, such as manipulation of ultrasonic waves.

Returning to FIG. 1, a transducer 14 is attached to one end 10*c* of the biaxial slab 10. The transducer 14 is activated by conventional activation means (not shown). The transducer 14 generates an ultrasonic wave that travels through the slab 10 in the direction 16 shown. A target 18, e.g., a movable detector, is located at the opposite end 10*d*. The movable detector 18 moves along the gradient direction 12 and detects the ultrasonic wave. Due to the nature of the gradient direction 12, a signal 20 that varies as a function of the distance from one surface 10*a* to the opposite surface 10*b* is received by the detector 18. Such variations can take the form of parabolic, gaussian, or other intensity distribution. Such a signal is thus focused by the high-low-high acoustic velocity gradient.

On the other hand, if a low-high-low acoustic velocity gradient is used, then the signal would be dispersed, or defocused, by the gradient.

The target 18, while shown in FIG. 1 as a detector, may also be an imaging sensor, a specimen exposed to non-destructive testing, such as detection of flaws, or a material application that requires focused acoustic energy, such as cavitation in a liquid or breaking up of kidney stones or gall stones in a living body.

FIG. 2 is an illustration of a potential use of the functionally graded material as a waveguide for the propagation of acoustic waves. The wave propagation mechanism along direction 16 shows their sinusoidal nature 19 and their confinement within certain modes to prevent energy loss at the surfaces 10*a*, 10*b*. Also shown in the FIG. 2 is the pitch P of the propagating wave, the length of which is dependent upon the acoustic velocity gradient in the slab 10 and the divergence angle of the acoustic beam emitted from the transducer 14. The total length L of the waveguide can be varied to obtain a specific output beam characteristic (converging, diverging, collimating, etc.).

The joining of two individual slabs of gradient material along their faces of high value of a given property (low-high-low) or along their faces of low value of a given property (high-low-high) may be done using a suitable cement or by fusing the two pieces together at an appropriate fusing temperature.

The composition of the glass employed in the practice of the present invention must be one that does not attenuate the signal at a given frequency, since a typical glass will not be effective over the entire frequency range.

EXAMPLE

A piece of homogeneous glass (12×12×60 mm), a cemented biaxial (12×12×60 mm), and a fused biaxial (12×12×20 mm) were tested for the ultrasonic wave (USW) intensity across the thickness (essentially the focusing behavior). The acoustic velocity gradients were obtained by fusion/diffusion of base glasses with the material properties listed in the Table below. The homogeneous glass is glass B in the Table, while the cemented and fused biaxials each comprise two monoaxial slabs of glass of three layers each, fused and diffused (glasses A, B, and C). Glasses A, B, and C are each commercially-available lead silicates.

| Base Glass | Density, g/cm$^3$ | Elastic Modulus ($10^3$ N/mm$^2$) | Poisson's Ratio | Calculated $V_T$ (m/s) | Calculated $V_L$ (m/s) |
|---|---|---|---|---|---|
| A | 3.61 | 57 | 0.220 | 4,245.8 | 3,267.9 |
| B | 4.22 | 56 | 0.230 | 3,922.2 | 2,322.6 |
| C | 5.51 | 54 | 0.248 | 3,423.0 | 1,981.5 |

The two axial gradient pieces were joined along their low acoustic velocity faces, providing a high-low-high slab for focusing USW. A 14 MHz transducer 14 was used for sending the USW into the material. The detector 18 for sensing the USW intensity was moved along the gradient direction 12.

The samples were prepared as follows: For making an electrical contact between a sample 10 and a piezoquartz transducer, each sample was covered with a layer of silver. A mineral oil of low viscosity was applied to make an acoustic contact. The USW generator 14installed at one sample butt-end 10*a* was a piezoquartz element with a diameter of 20 mm; a small piezoquartz waveguide served as the USW detector 18 at the opposite butt-end surface 10*b*. The accuracy of moving the detector was 0.01 mm, and the relative error in measurement of the USW amplitude was about 5 to 10%, depending on the conditions of measurement. The propagation of the pulse longitudinal USW at the frequency of 14 MHz was investigated, extending in a direction of a large axis of a sample. The USW pulse duration changed from 2 up to 5 μsec, depending on the length of the sample. The lengths of the USW were about 0.2 to 0.3 mm, which was less than the cross-sectional dimensions of the samples and so permitted application of the ray model of propagation of USW in such samples.

The Table above shows (1) the properties of the base glasses (glasses A, B, and C) and (2) the calculated acoustic wave velocities, based on Eqns. 1 and 2 above. It will be clear to those skilled in this art that the changes ($\Delta V_T$ and $\Delta V_L$) are significant (24% and 65%, respectively).

FIGS. 3*a* and 3*b* schematically illustrate the scanning of the sample butt-end by the USW detector 18 in two directions for the biaxial gradient slabs 10. In one embodiment, cement layer 22 was used to join two separate glass pieces 24*a*, 24*b* to form the slab 10. In a second embodiment, the two separate glass pieces 24*a*, 24*b* were joined along the interface 22 by fusing them together. The detector 18 moved in the direction denoted 26. In FIG. 3*a*, the detector 18 was moved such that the gradient direction of the acoustic velocity, $\nabla_{\vec{v}}$, was parallel to the X-direction. In FIG. 3*b*, the detector 18 was moved such that $\nabla_{\vec{v}}$ was perpendicular to the X-direction. ΔY is the shift of the detector 18 from the sample butt-end edge.

FIG. 4 depicts the USW amplitude measured along the X-direction for the homogeneous glass B. ΔY was 6 mm. In this case, there was considerable symmetry in the USW intensity about the central plane, as seen in Curve 28. The central plane of symmetry had a minimum and there was a maximum in intensity on both sides. This behavior is not entirely unusual. The absence of a flat peak in the intensity distributed across the thickness of the specimen, which might otherwise be expected, is most probably due to the interference of the direct beam and the beam reflected off the side walls of the glass sample.

Figure 5A:
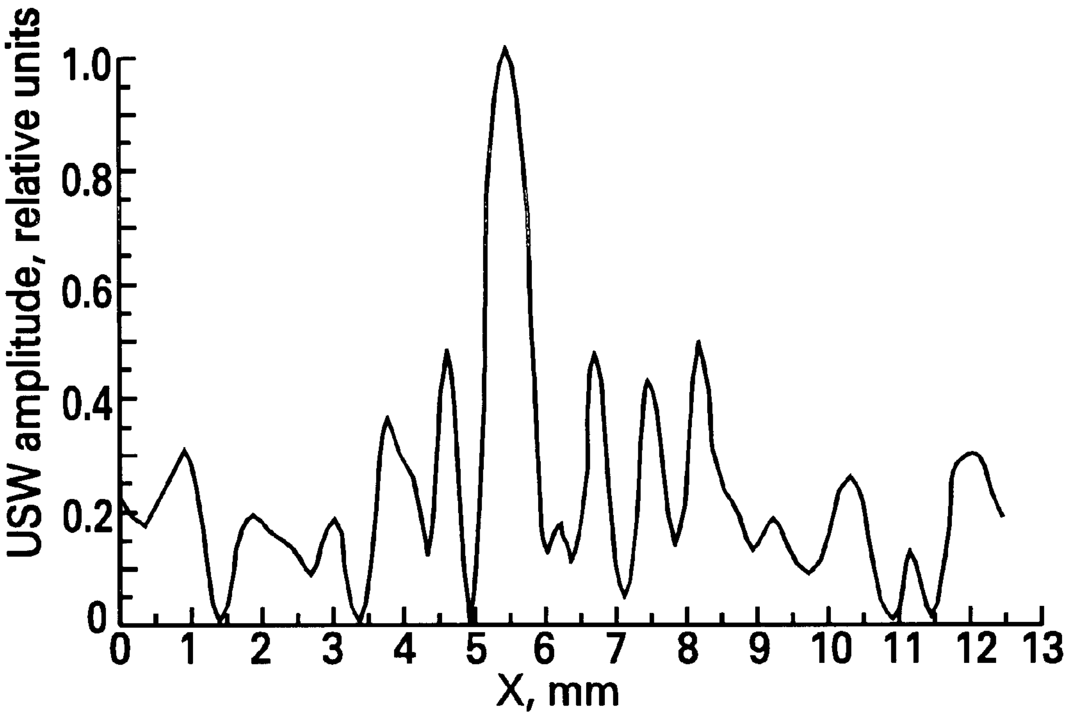
FIG. 5*a*, on coordinates of amplitude (relative units) and distance X (in mm), is a plot of the ultrasonic wave amplitude as a function of distance along the X-direction for a cemented biaxial gradient sample, where ΔY is 2.5 mm and $\nabla_v^{\rightarrow}$ is parallel to the X-direction.
Figure 5B:
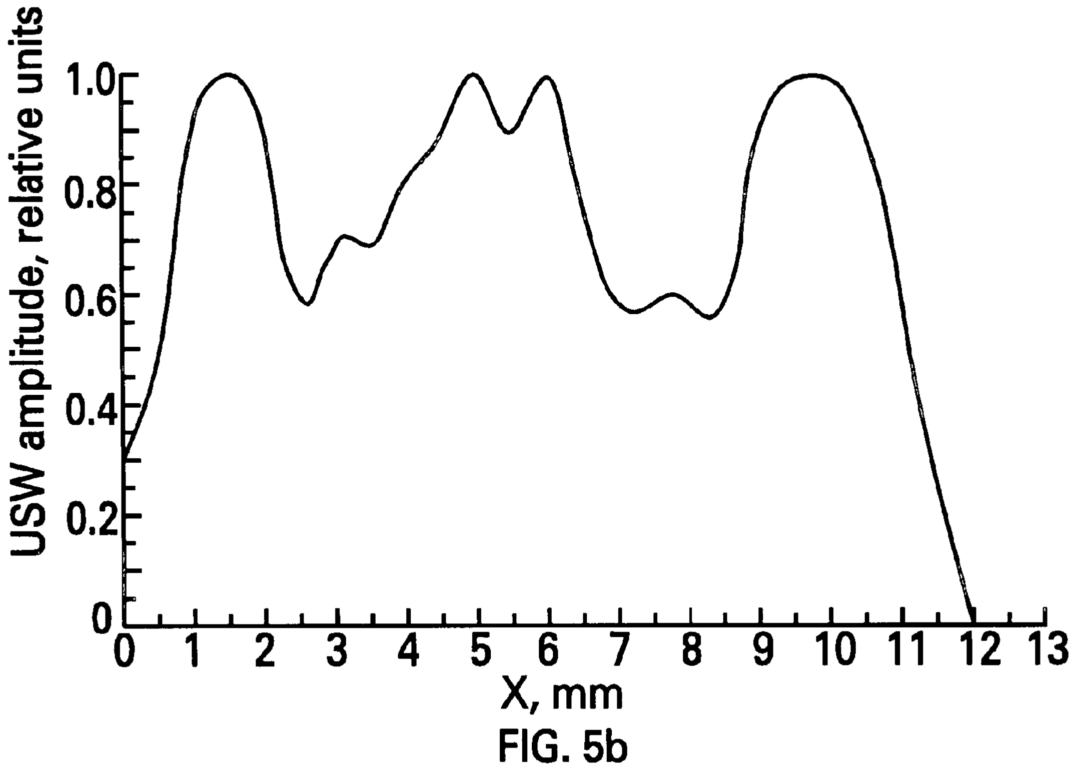
FIG. 5*b* is similar to FIG. 5*a*, but with $\nabla_v^{\rightarrow}$ perpendicular to the X-direction.

FIGS. 5*a* and 5*b* show the measurements taken with $\nabla_{\vec{v}}$ parallel to the X-direction (FIG. 5*a*) and perpendicular to the X-direction (FIG. 5*b*). ΔY was 2.5 mm. The slab 10 comprised two separate pieces 24*a*, 24*b* joined along interface 22 with a suitable cement. The acoustic velocity gradient configuration from one surface 10*a* to the opposite surface 10*b* was high-low-high.

Figure 6A:
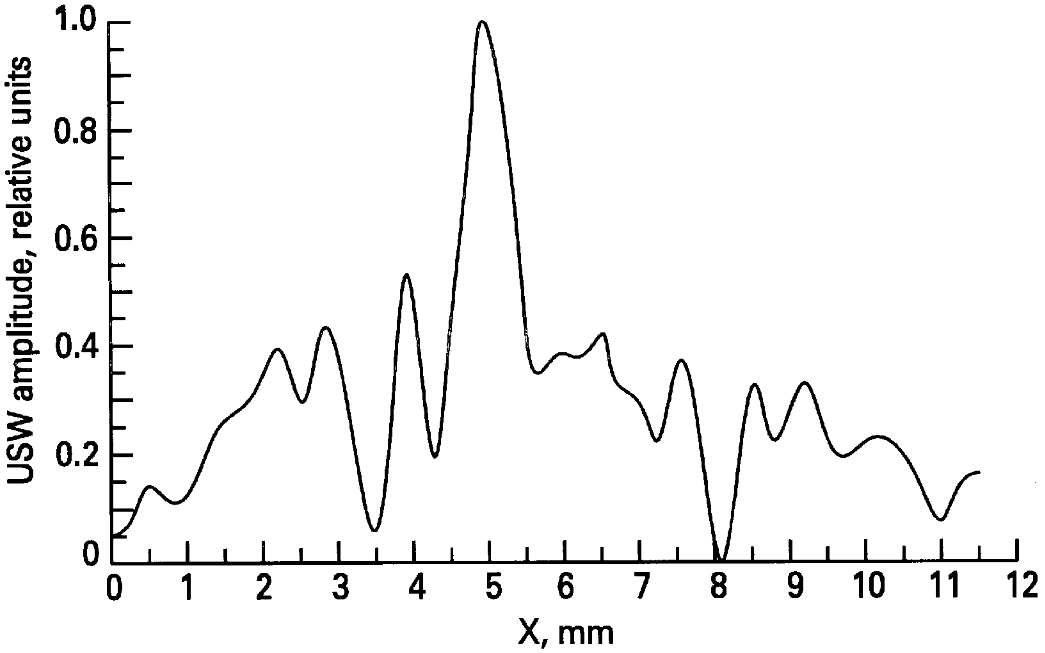
FIG. 6*a*, on coordinates of amplitude (relative units) and distance X (in mm), is a plot of the ultrasonic wave amplitude as a function of distance along the X-direction for a fused biaxial gradient sample, where ΔY is 6 mm and $\nabla_v^{\rightarrow}$ is parallel to the X-direction.
Figure 6B:
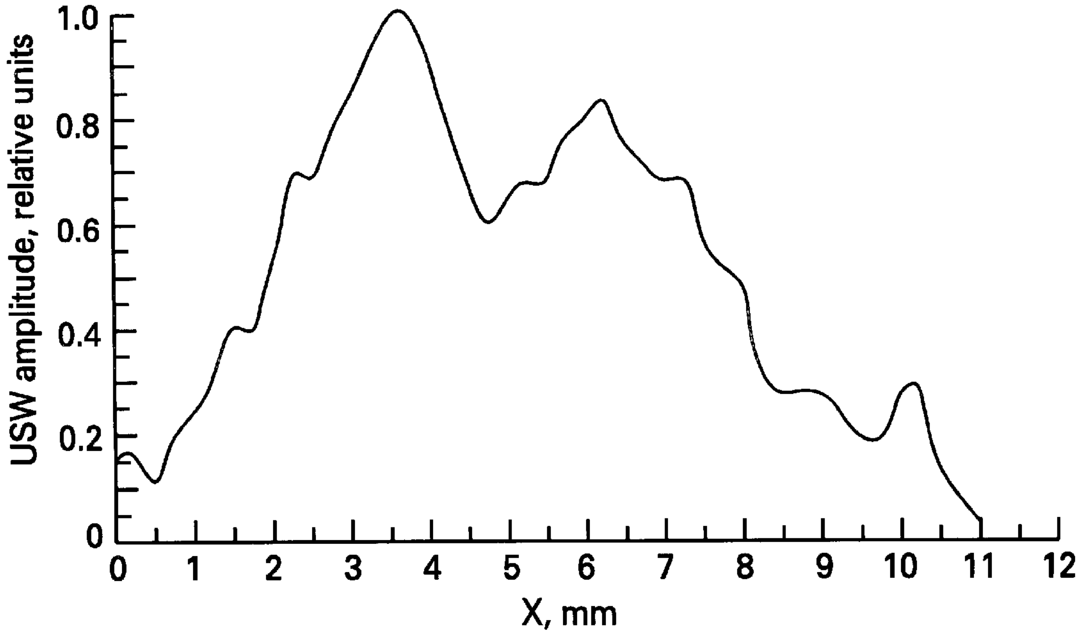
FIG. 6*b* is similar to FIG. 6*a*, but with $\nabla_v^{\rightarrow}$ perpendicular to the X-direction.

FIGS. 6*a* and 6*b* show the measurements taken with $\nabla_{\vec{v}}$ parallel to the X-direction (FIG. 6*a*) and perpendicular to the X-direction (FIG. 6*b*). ΔY was 6 mm. The slab 10 comprised two separate pieces 24*a*, 24*b* joined along interface 22 by fusion. The acoustic velocity gradient configuration from one surface 10*a* to the opposite surface 10*b* was high-low-high.

The gradient samples showed a different behavior than the homogeneous glass sample. The central plane of symmetry had a maximum in intensity. However, there were secondary maxima present on either side of the central primary maximum. It is also worth noting that the intensity distribution was not symmetrical about the central plane. This is currently being attributed to the sample geometry, reflection off of the side walls and the cemented central plane of symmetry.

INDUSTRIAL APPLICABILITY

The device for manipulating acoustic waves employing a functionally-graded material disclosed herein is expected to find use in the focusing, dispersing, steering, waveguiding, etc. of acoustic waves.

Thus, there has been disclosed a device for manipulating acoustic waves employing a functionally-graded material and a process for making the same. It will be readily apparent to those skilled in this art that various changes and modifications of an obvious nature may be made, and all such changes and modifications are considered to fall within the scope of the present invention, as defined by the appended claims.

What is claimed is:

1. A device for manipulation of acoustic waves comprising a functionally-graded material for interposing between a source of said acoustic waves and a target for acoustic waves, said material having a gradient in acoustic wave velocity that is perpendicular to a direction of said acoustic waves wherein either (a) said material comprises a slab having said gradient from a first major surface to a second, opposite major surface, said first major surface and said second major surface defined by planes parallel to said direction of propagation, said gradient having a relatively high value in said acoustic wave velocity at one said major surface and a relatively low value in said acoustic wave velocity at said opposite major surface, said acoustic waves being steered toward said relatively low value of acoustic wave velocity or (b) said material comprises a slab having a gradient from a first major surface to a central region in said slab and from said central region to a second, opposite major surface, said first major surface and said second major surface defined by planes parallel to said direction of propagation, said gradient having a first value in said acoustic wave velocity at said first major surface and at said second major surface and a second, different value in said acoustic wave velocity in said central region and wherein said manipulated sonic waves are focused, dispersed, steered, or waveguided.

2. The device of claim 1 wherein said gradient in said acoustic wave velocity is obtained by generation of a gradient in at least one of elastic modulus, Poisson's ratio, and density of said material.

3. The device of claim 1 wherein said first value is relatively high and said second value is relatively low, forming a high-low-high configuration in said gradient from said first major surface to said central region to said second major surface.

4. The device of claim 3 wherein said gradient is used to focus or waveguide said acoustic waves.

5. The device of claim 1 wherein said first value is relatively low and said second value is relatively high, forming a low-high-low configuration in said gradient from said first major surface to said central region to said second major surface.

6. The device claim 5 wherein said gradient is used to disperse said acoustic waves.

7. A method of making a device for manipulation of acoustic waves comprising:

(a) providing a source of ultrasonic waves;

(b) providing a target for acoustic waves;

(c) providing a functionally-graded material having a gradient in acoustic wave velocity, wherein either (a) said material comprises a slab having said gradient from a first major surface to a second, opposite major surface, said first major surface and said second major surface defined by planes parallel to said direction of propagation, said gradient having a relatively high value in said acoustic wave velocity at one said major surface and a relatively low value in said acoustic wave velocity at said opposite major surface, said acoustic waves being steered toward said relatively low value of acoustic wave velocity or (b) said material comprises a slab having a gradient from a first major surface to a central region in said slab and from said central region to a second, opposite major surface, said first major surface and said second major surface defined by planes parallel to said direction of propagation, said gradient having a first value in said acoustic wave velocity at said first major surface and at said second major surface and a second, different value in said acoustic wave velocity in said central region;

(d) interposing said functionally-graded material between said source of acoustic waves and said target of acoustic waves such that said gradient is perpendicular to a direction of propagation of said acoustic waves, wherein said manipulated sonic waves are focused, dispersed, steered, or waveguided.

8. The method of claim 7 wherein said gradient in said acoustic wave velocity is obtained by generation of a gradient in at least one of elastic modulus, Poisson's ratio, and density of said material.

9. The method of claim 7 wherein said first value is relatively high and said second value is relatively low, forming a high-low-high configuration in said gradient from said first major surface to said central region to said second major surface.

10. The method of claim 9 wherein said gradient is used to focus or waveguide said acoustic waves.

11. The method of claim 7 wherein said first value is relatively low and said second value is relatively high, forming a low-high-low configuration in said gradient from said first major surface to said central region to said second major surface.

12. The device of claim 11 wherein said gradient is used to disperse said acoustic waves.

13. The method of claim 7 wherein said functionally-graded material comprises a glass.

14. The method of claim 13 wherein said glass is formed by a fusion/diffusion process.

15. The method of claim 14 wherein said fusion/diffusion process is carried out by (a) providing at least two layers of a compatible materials having two different values in said material property;

(b) stacking said at least two layers in a pre-determined fashion to form a stack having a step gradient in said material property, said step gradient traversing said stack from its bottom surface to its top surface;

(c) subjecting said stack to an elevated temperature for a period of time sufficient to form a continuous gradient from said bottom to said top surface; and (d) cooling said stack to an operational temperature.

16. The method of claim 15 further comprising interposing said stack between said source of acoustic waves and said target of manipulated acoustic waves such that said acoustic waves are propagated perpendicular to said gradient of said material property.

* * * * *